United States Patent [19]

Westrom et al.

[11] 3,916,260
[45] Oct. 28, 1975

[54] FUSE HOLDER ASSEMBLY

[75] Inventors: Arthur Clifford Westrom, Stone Mountain, Ga.; John LaVerne Fisher, Lexington; Peter Mayer, Versailles, both of Ky.

[73] Assignee: Kuhlman Corporation, Troy, Mich.

[22] Filed: Apr. 8, 1974

[21] Appl. No.: 459,172

[52] U.S. Cl. ............... 317/15; 317/40 A; 337/162
[51] Int. Cl.$^2$ ......................................... H02H 7/04
[58] Field of Search................... 337/144, 145, 162; 317/14 R, 15, 40 A

[56] References Cited
UNITED STATES PATENTS

| | | | |
|---|---|---|---|
| 3,210,604 | 10/1965 | Nelson | 317/15 |
| 3,365,616 | 1/1968 | Hermann | 317/15 |
| 3,628,092 | 12/1971 | Keto | 317/15 |

*Primary Examiner*—James D. Trammell
*Attorney, Agent, or Firm*—Everett R. Casey

[57] ABSTRACT

A fuse holder assembly which is particularly adapted to be utilized in conjunction with the protection system for the primary side of an oil-filled transformer assembly, wherein the fuse holder is mounted on a plate, the plate being supported on the face of the transformer casing. The fuse holder extends from the plate through an aperture in the transformer housing to support the fusing elements below the level of the cooling liquid within the transformer housing. The fusing elements are a current limiting fuse and a weaklink fuse which are mechanically supported by the fuseholder and which can both be withdrawn from the transformer casing with the fuseholder, to permit inspection and replacement.

19 Claims, 9 Drawing Figures

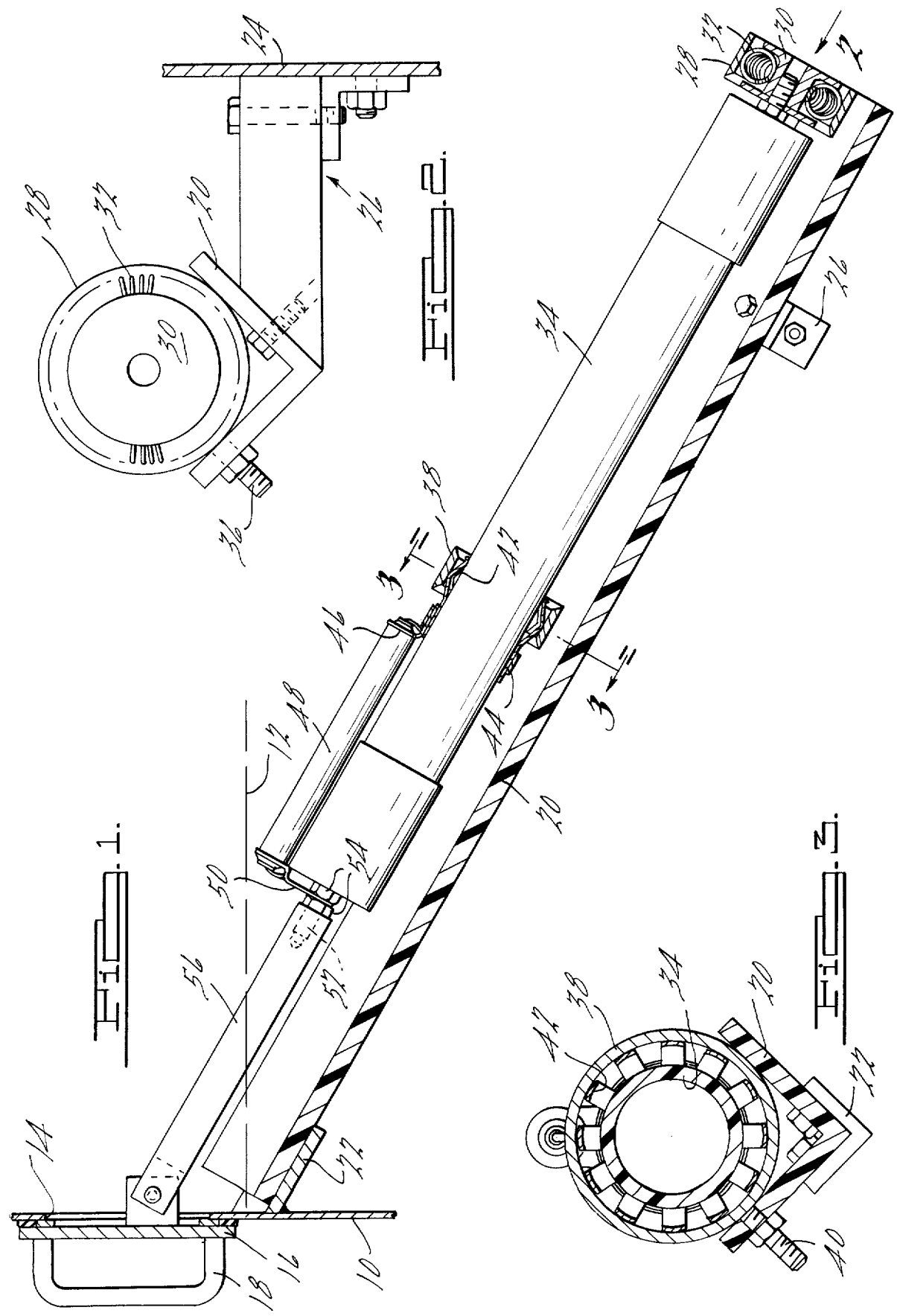

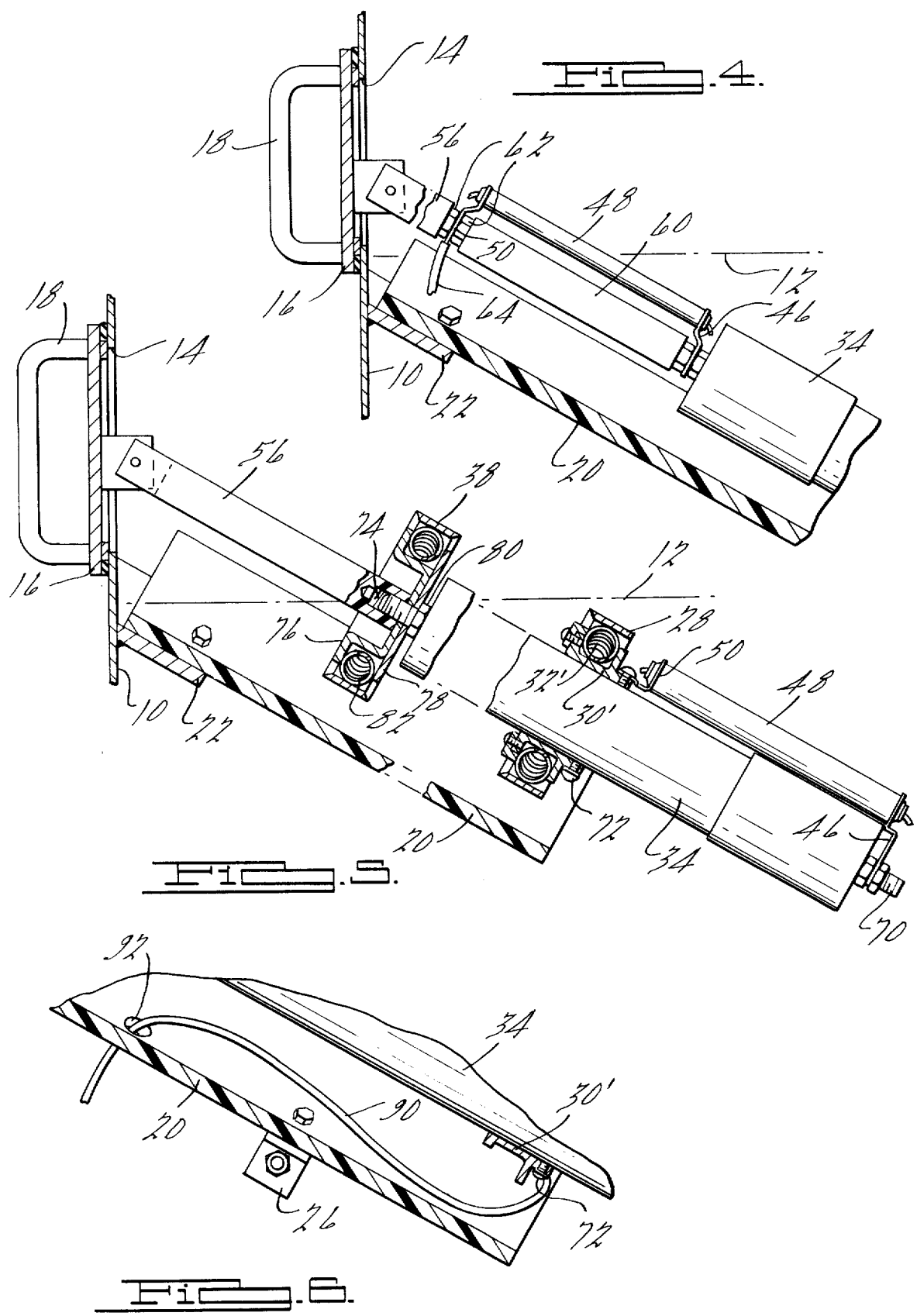

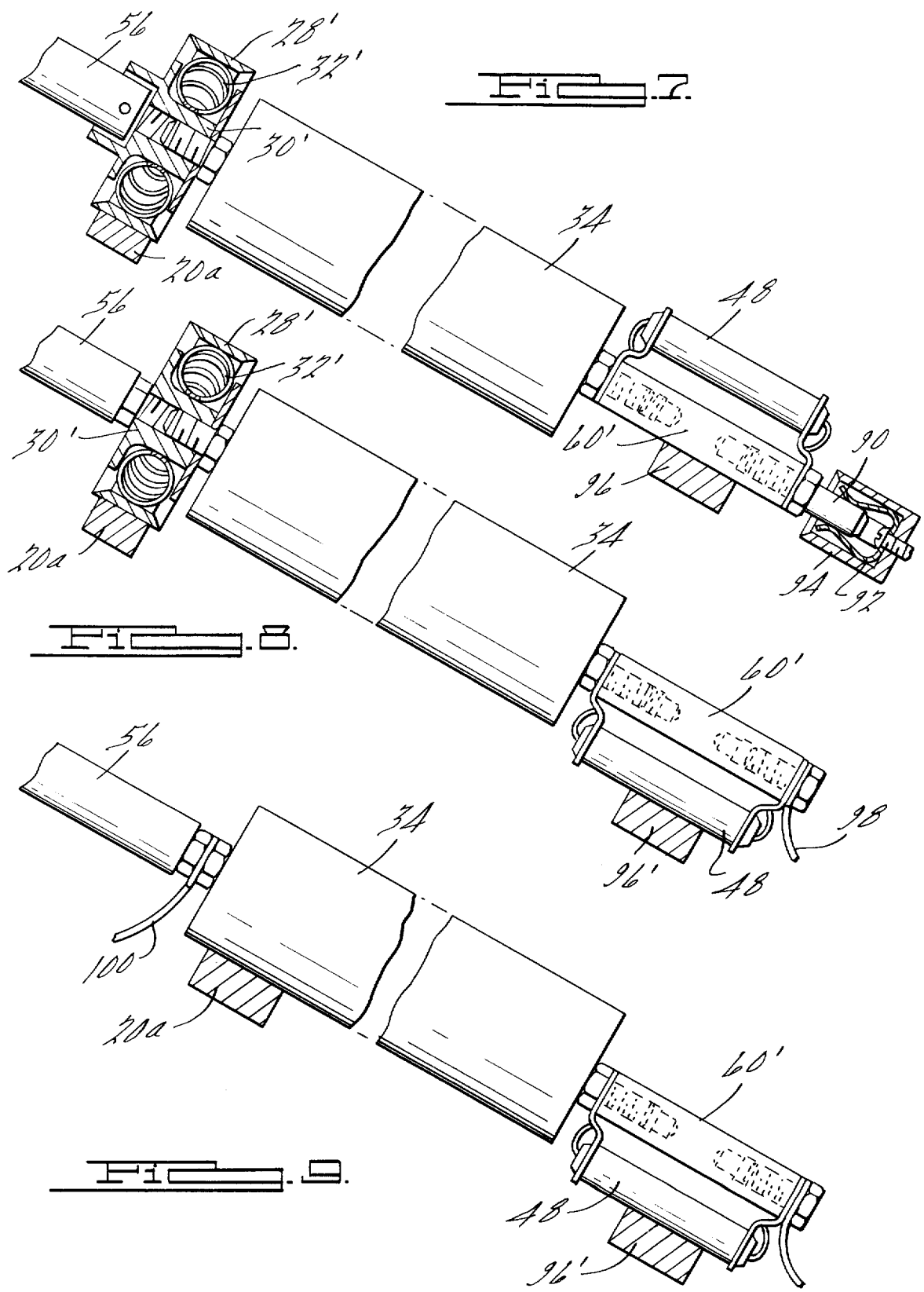

3,916,260

FUSE HOLDER ASSEMBLY

CROSS REFERENCE

This invention is related to those of U.S. Pat. No. 3,699,490 granted Oct. 17, 1972, and of U.S. Pat. No. 3,701,926 granted Oct. 31, 1972, and is further related to those in the United States patent application of Arthur C. Westrom, Ser. No. 459,171, entitled "Fuse Holder Assembly" and the United States patent application of Peter Mayer and William H. Russell, Ser. No. 459,173, entitled "Fuse Holder Assembly", both filed Apr. 8, 1974.

BRIEF SUMMARY OF THE INVENTION

This invention relates to an improved mechanism for electrically fusing liquid cooled electrical induction equipment such as power and distribution transformers. The invention is of particular usefulness in protecting pole type, pad mounted and underground oil-filled distribution transformers. For protection under a broad range of fault conditions, the combination of an oil-immersible current limiting fuse and an oil-immersible weaklink fuse, of commercially available types, is supported internally of the transformer housing and immersed in the liquid coolant within that housing, and in the preferred use, the fuses are serially connected with the primary windings of the transformer. Since the weaklink fuse responds to oil temperature, it reacts to secondary loads and faults, and as a result the oil-immersed combination can provide secondary fault control, high-energy internal fault control, high current internal fault control, overload control, tank temperature control, and oil temperature control.

The fuse combination is mounted on a fuse holder member which controls its immersed position relative to the other components of the transformer. The fuse holder and fuse combination can be withdrawn through a normally covered access opening in the transformer housing for field inspection and replacement of one or both of the fuses.

DESCRIPTION OF THE DRAWINGS

FIG. 1 is an elevational view, in partial section, of a fuse holder assembly embodying certain of the principles of the present invention;

FIG. 2 is an end elevational view taken in the direction of the labeled arrow in FIG. 1;

FIG. 3 is a section taken substantially along the line 3—3 of FIG. 1;

FIG. 4 is a fragmentary elevational view, in partial section, of another fuse holder assembly embodying certain of the principles of the present invention;

FIG. 5 is a fragmentary elevational view, in partial section, of another fuse holder assembly embodying certain of the principles of the present invention;

FIG. 6 is a fragmentary sectional view of another feature of the construction of a fuse holder assembly embodying certain of the principles of the present invention;

FIG. 7 is a fragmentary elevational view, in partial section of another fuse holder assembly embodying certain of the principles of the present invention;

FIG. 8 is a fragmentary elevational view, in partial section of another fuse holder assembly embodying certain of the principles of the present invention; and FIG. 9 is a fragmentary elevational view, in partial section of another fuse holder assembly embodying certain of the principles of the present invention.

DETAILED DESCRIPTION

The fuse holder assembly disclosed herein is intended to be associated with a conventional transformer having a housing including a casing having a plurality of walls, including wall 10, closed by a suitable cover. The transformer, of course, includes internal components including primary and secondary windings immersed in a suitable dielectric coolant, such as oil, the level of the surface of which is denoted 12 in the drawings.

Casing wall 10 is provided with an access opening 14 which is normally covered by a gasketed plate 16, provided with a handle 18, plate 16 being removably secured in place in any suitable manner.

Within the transformer casing, a support and guide member 20 is fixedly secured in place. In the embodiment illustrated in FIG. 1, support and guide member 20 engages and is supported by a bracket 22 welded or otherwise secured to casing wall 10 and is further secured to an adjacent wall 24 (FIG. 2) of the transformer casing by means of an assembly including bracket assembly 26. Support and guide member 20 is preferably of suitable dielectric material such as glass fiber impregnated epoxy.

An electrical contact sleeve 28 is secured at the lower end of support and guide member 20 (the end remote from opening 14). Sleeve 28 removably accepts an assembly comprising an arbor 30 and an annular coil contact spring 32 which is trapped between parallel flanges on arbor 30. Arbor 30 threadedly engages the stud terminal of a current limiting fuse 34, of a commercially available type.

A stud 36 (FIG. 2), electrically and mechanically integral with sleeve 38, projects through member 20 to not only secure sleeve 28 in place but to constitute an electrical terminal for connection of the sleeve to, for example, the line or source of power, which normally appears at a terminal or bushing on the transformer housing.

At a point between the ends of the fuse 34, another electrical contact sleeve 38 is correspondingly secured to the member 20 by means of a stud 40 (FIG. 3) which also serves as a terminal to connect the fuse assembly to, for example, a terminal of the primary winding of the transformer.

Sleeve 38 accepts a flexible contact assembly in the form of a plurality of conducting spring fingers 42 which are secured about the periphery of the body of the fuse 34 by means such as a clamp sleeve 44.

An angled terminal bracket 46, clamped to the fingers 42 and secured in place on the body of fuse 34 by clamp sleeve 44, mechanically supports and electrically engages one end of a weaklink fuse 48. At its other end, fuse 48 is provided with a terminal strap 50 having an aperture which is insertable on the threaded stud 52 on the current limiting fuse 34 and is retained in good electrical contact and in mechanical position by a pair of nuts 54. Stud 52 threadedly engages the end of an elongated insulative fuse holder member 56, the other end of which (the end proximate opening 14) is pivotedly secured to plate 16.

Current limiting fuse 34 and weaklink fuse 48 (as well as the correlative current limiting fuses in the other figures of the drawings) may be of any suitable, appropriately rated commercially available types such as those manufactured by Kearney-National, Inc.

In general, current limiting fuses perform well on high current faults but under some circumstances can tend to perform less satisfactorily in the low-current region, tending to overheat, with extended-duration low-current fault conditions, to the possible point of blowing up. The weaklink fuses, on the other hand, while less satisfactory on high fault currents, perform well under low-current fault conditions. Accordingly, a coordinated series combination of the two can provide highly improved full-range fault protection. In the present utilization, the weaklink fuse senses, or may sense, oil temperature.

It will be seen that with the above noted representative interconnection, current flows from the line terminal of the transformer to sleeve 38, through weaklink fuse 48, through the current limiting fuse 34 and through the sleeve 28 and terminal 36 to one terminal of the primary winding of the transformer.

For inspection or replacement, plate 16 is released from casing wall 10 and handle 18 is grasped and moved in a direction generally along the longitudinal axis of current limiting fuse 34. This withdraws the combination of fuse holder 56, weaklink fuse 48 and current limiting fuse 34. In the process arbor 30 and spring 32 are withdrawn from sleeve 28, and fingers 42 are withdrawn from sleeve 38. After inspection and any necessary replacement, the assembly is reinserted into position, being guided and supported by the support and guide member 20, including the contact sleeves 28 and 38 supported thereon.

It will be observed that in the embodiment of FIG. 1, the weaklink fuse is supported directly on the current limiting fuse and that the longitudinal axis of the weaklink fuse 48 is laterally spaced from the longitudinal axis of the current limiting fuse 34. In the alternative construction of FIG. 4 of the drawings, weaklink fuse 48 is moved forwardly (in the direction of opening 14) so that it does not overlap current limiting fuse 34, and is moved towards the longitudinal axis of current limiting fuse 34, to thereby reduce the overall diameter of the withdrawable assembly. For ease of representation, fuse holder member 56 has been illustrated to be artificially short, and in a practical unit, the length of member 56 would be determined by the permissable spacing between the forward terminal of fuse 48 and electrical ground.

In the embodiment of FIG. 4, the fuse holder member 56 further includes an insulating portion 60 provided with a socket and nut assembly correlative to that described in connection with FIG. 1 to accept both the stud of the current limiting fuse 34 and the terminal bracket 46. The two portions 56 and 60 of the fuse holder member are also shown to be similarly interconnected, including the use of a stud, and a pair of nuts 62 to trap the terminal strip 50 of the fuse 48 therebetween. In this embodiment, connection to the lower terminal of the current limiting fuse 44 is made either with a quick detachable connection, such as the type illustrated in FIG. 1, or with a lug and nut arrangement. Current limiting fuse 34 and weaklink fuse 48 are electrically interconnected through terminal 46, while the remaining terminal 50 of fuse 48 is suitably connected to the primary winding by a conductor 64. Conductor 64 should be sufficiently long to permit its withdrawal through opening 14 during inspection of the assembly.

In the embodiment of FIG. 5, electrical contact sleeves 28 and 38 are again supported upon (and constitute a part of) support and guide member 20 in a manner similar to that above described. However, in this case, the weaklink fuse 48 is transferred to the lower end of the fuse 34, with its electrical terminal 46 engaging the lower stud 70 of the fuse 34. The terminal 50 of fuse 48 is screwed or otherwise secured into proper mechanical and electrical relationship with the arbor 30' of a detachable contact assembly similar to that described in connection with FIG. 1, except that arbor 30' is mounted on the insulative body of fuse 34. Arbor 30' may, if desired, be formed into two semi-circular sections to facilitate its assembly to fuse 34. Alternatively, arbor 30' may be sufficiently large to insert over the end caps of fuse 34 and mechanically locked in selected position on the body of fuse 34 as by means of screws 72.

At its forward or upper end, the stud 74 of fuse 34 is screwed into the fuse holder member 56, with a pair of plates 76 and 78 being trapped on stud 74 between member 56 and nut 80. Plates 76 and 78 are formed to accept annular coil contact spring 82, which is trapped between flanges thereof, and which makes detachable electrical engagement with sleeve 38. It will be perceived that both sleeves 28 and 38 should be larger than the effective diameter of the combination of fuses 34 and 48.

When handle 18 is moved to withdraw the fuse assembly, the support and guide member 20 including its electrical contact sleeves 28 and 38, remains in place, with the spring 82 and plates 76 and 78 moving forwardly out of sleeve 38, with spring 32' and arbor 30' moving out of contact with sleeve 28, and with the fuses 34 and 48 passing through sleeves 28 and 38 in which they are guided during withdrawal and reinsertion.

Assuming the electrical connections to be as described in connection with FIG. 1, a series circuit is established from the power bushing or terminal in the transformer through sleeve 38, spring 82, plates 76 and 78, terminal 74, fuse 34, terminal 46, fuse 48, terminal 50, arbor 30', coil spring 32', and then through sleeve 28 to the primary winding of the transformer.

The alternative arrangement illustrated in FIG. 6 illustrates that a conductor connection, rather than a readily detachable connection, can be employed in the embodiment of FIG. 5, if desired. Thus, in the arrangement of FIG. 6, counterparts of spring 32' and sleeve 28 may be omitted and a conductor 90 may be connected, by screw 72, to arbor 30' or another counterpart thereof. Conductor 90 may be trained through an aperture 92 formed in sleeve 20 so as to insure that that conductor will not inadvertantly be moved into improper proximity with other elements of the transformer during either withdrawal or reinsertion of the fuse assembly. Correspondingly, conductor 64 in FIG. 4 of the drawings (which illustrates a practice which may also be employed with the embodiment of FIG. 5 or the other embodiments) may be correspondingly trained through a guide aperture in the support and guide member 20 for corresponding purposes.

The embodiment of FIG. 7 illustrates that the weaklink fuse 48 may, if desired, be disposed to the right of the current limiting fuse 34 and in non-overlapping relationship therewith. In this arrangement, a quick detach contact arrangement similar to that described in connection with FIG. 1 is used at the upper end of fuse 34, with electrical contact sleeve 28' being supported on a counterpart 20a of the support and guide member 20 of FIG. 1. An insulative rod 60', a counterpart of rod 60 of FIG. 4 (and constituting a separate portion of the fuse holder member 56) is co-axially mounted at the rear of the fuse 34 and mechanically supports fuse 48 in a manner similar to that described in connection with FIG. 4. The rear or right-hand end of element 60' includes a chamfered end pin or stud 90 which engages a tulip spring contact 92 secured within a housing 94, with the series electrical connection being established through contact assembly 92. A support means 96 is positioned to guide and support element 60' and may either be a portion of an extended member counterpart of the support and guide member 20 of FIG. 1 or may be an insulative counterpart of bracket assembly 26' in FIG. 2. It is, in either event, an element of the support and guide member or means in this embodiment.

FIG. 8 of the drawings illustrates two modifications of the arrangement of FIG. 7. First, it illustrates the use of a conductor and lug assembly 98 as replacement for the detachable contact assembly of FIG. 7. Further, it illustrates that the physical engagement between the support and guide means element 96' and the inner or lower end of the fuse assembly may actually occur with the fuse 48 instead of with the element 60'.

FIG. 9 of the drawings illustrates that the forward detachable contact assembly (including elements 30', 32' and 28' in FIG. 8) may take the form of a conductor and lug assembly 100 and further illustrates that the support and guide means 20a for supporting the leading or forward end of the fuse assembly may directly engage the current limiting fuse 34.

What is claimed is:

1. In a transformer assembly having a housing having a line terminal, a winding assembly supported in the housing and having a primary winding terminal, and a cooling liquid within the housing for cooling the winding, the combination of means defining a separate fuse assembly accepting opening in said housing above the level of the cooling liquid spaced from the line terminal, means removably attachable to said housing for closing said opening, a fuse holder member, first securing means on said fuse holder for detachably securing in fixed relation thereto a current limiting fuse, second securing means for removably supporting a separate weaklink fuse on the combination of said fuse holder member and the current limiting fuse, said first and second securing means permitting separate replacement of the current limiting fuse and of the weaklink fuse, support and guide means rigidly supported in said housing in a fixed position, said fuse holder member and said support and guide means supporting the current limiting and the weaklink fuses below the level of and immersed in the cooling liquid, means for detachably electrically interconnecting the current limiting and the weaklink fuses, means for permitting the withdrawal of said fuse holder member including the separate current limiting and weaklink fuses from the housing through the opening therein, and means including said support and guide means for guiding the assembly of said fuse holder member and the separate current limiting and weaklink fuses during the withdrawal, reinsertion and use thereof and for permitting longitudinal movement of said fuse holder member and the separate current limiting and weaklink fuses during withdrawal and reinsertion.

2. The combination of claim 1 in which the transformer housing has a plurality of walls, and in which said support and guide means is secured to at least one of said walls and engages the combination of said fuse holder member and the current limiting and weaklink fuses when said combination is fully inserted in the transformer housing.

3. The combination of claim 2 in which said fuse holder member includes portions disposed at opposite ends of one of the fuses, and in which said support and guide means includes a portion engageable with the portion of said fuse holder member which is remote from the opening in the transformer housing when the fuse holder assembly is in use.

4. The combination of claim 3 in which said one of the fuses is the current limiting fuse.

5. The combination of claim 2 in which said fuse holder member includes portions disposed at opposite ends of one of the fuses and in which said support and guide means includes a portion engageable with the portion of said fuse holder member which is proximate to the opening in the transformer housing when the fuse holder assembly is in place.

6. The combination of claim 5 in which said support and guide means also includes a portion which is engageable with the portion of said fuse holder member which is remote from the opening in the transformer housing when the fuse holder assembly is in place.

7. The combination of claim 2 in which said support and guide means direcly engages and directly at least one of the fuses.

8. The combination of claim 2 in which said fuse holder member includes portions disposed at opposite ends of one of the fuses, and in which said support and guide means includes a portion engageable with said one of the fuses.

9. The combination of claim 2 in which said support and guide means is secured to two different walls of the transformer housing.

10. The combination of claim 1 in which said means for removably supporting a weaklink fuse supports the weaklink fuse directly on the current limiting fuse.

11. The combination of claim 1 in which said means for removably supporting a weaklink fuse supports the weaklink fuse directly on the fuse holder member.

12. The combination of claim 1 in which said means for removably supporting a weaklink fuse supports the weaklink fuse in lateral overlapping relation with the current limiting fuse.

13. The combination of claim 1 in which said means for removably supporting a weaklink fuse supports the weaklink fuse in a position longitudinally spaced from the current limiting fuse.

14. The combination of claim 1 further including connector means for connecting the current limiting fuse to one of the transformer terminals, and connector means for connecting the weaklink fuse to the other one of the transformer terminals.

15. The combination of claim 14 in which at least one of said connector means is a quick detachable connector.

16. The combination of claim 14 in which both of said connector means are quick detachable connectors.

17. The combination of claim 14 in which at least one of said connector means is an elongated wire, in which said support and guide means further includes means for controlling the movement of said elongated wire.

18. The combination of claim 1 in which said means for permitting the withdrawal of said fuse holder member includes said means for closing said opening.

19. In a transformer assembly having a housing having a line terminal, a winding assembly supported in the housing and having a primary winding terminal, and a cooling liquid within the housing for cooling the winding, the combination of means defining a separate fuse assembly accepting opening in said housing above the level of the cooling liquid spaced from the line terminal, means removably attachable to said housing for closing said opening, a current limiting fuse, a fuse holder member, first securing means on said fuse holder for detachably securing in fixed relation thereto said current limiting fuse, a weaklink fuse, second securing means for removably supporting said weaklink fuse on the combination of said fuse holder member and said current limiting fuse, said first and second securing means permitting separate replacement of said current limiting fuse and of said weaklink fuse, support and guide means rigidly supported in said housing in a fixed position, said fuse holder member and said support and guide means supporting said current limiting and said weaklink fuses below the level of and immersed in the cooling liquid, means for detachably electrically interconnecting said current limiting and said weaklink fuses, means for permitting the withdrawal of said fuse holder member including said separate current limiting and weaklink fuses from the housing through the opening therein, and means including said support and guide means for guiding the assembly of said fuse holder member and said separate current limiting and weaklink fuses during the withdrawal, reinsertion and use thereof and for permitting longitudinal movement of said fuse holder member and the separate current limiting and weaklink fuses during withdrawal and reinsertion.

* * * * *